United States Patent [19]

Hori et al.

[11] Patent Number: 4,626,931
[45] Date of Patent: Dec. 2, 1986

[54] CONTACT PRINTING APPARATUS WITH PRESETTABLE MEANS INDICATING NUMBER OF COPY AND MASTER TAPE LIFE EXPECTANCY

[75] Inventors: Takeshi Hori, Kanagawa; Yoshiharu Higano, Tokyo; Toshio Shirai, Kanagawa; Toru Naganuma, Tokyo, all of Japan

[73] Assignee: Sony Corporation, Tokyo, Japan

[21] Appl. No.: 738,766

[22] Filed: May 29, 1985

[30] Foreign Application Priority Data

May 29, 1984 [JP] Japan ............................... 59-109173

[51] Int. Cl.⁴ .............................................. G11B 5/86
[52] U.S. Cl. .......................................... 360/16; 360/73
[58] Field of Search ................... 360/15, 16, 137, 71, 360/73; 365/244

[56] References Cited

U.S. PATENT DOCUMENTS

| | | | |
|---|---|---|---|
| 3,459,901 | 8/1969 | Cooper | 360/15 X |
| 3,827,077 | 7/1974 | Kobilka | 360/16 |
| 3,893,167 | 7/1975 | Stahler | 360/16 |
| 4,101,938 | 7/1978 | Hanai | 360/16 |
| 4,410,917 | 10/1983 | Newdoll et al. | 360/15 |

FOREIGN PATENT DOCUMENTS

| | | | |
|---|---|---|---|
| D116427 | 8/1984 | European Pat. Off. | 360/16 |
| 54-68205 | 6/1979 | Japan | 365/244 |
| 54-118212 | 9/1979 | Japan | 360/137 |
| 58-161141 | 9/1983 | Japan | 360/16 |

OTHER PUBLICATIONS

IBM-TDB-Method to Determine Tape Transport Cleaning Frequency Based on Actual Amount of Tape Processed with Operator Prompting Via Display; vol. 26, No. 12; 5/84.
Journal of SMPTE, vol. 79, No. 10, Contact Duplication of Videotape Recordings by Daniel Esterly, Oct./1970.
FM & Television, Mar. 1949, "Multiple Tape Recording", by Martin N. Olson, pp. 30 and 32.

Primary Examiner—Raymond F. Cardillo
Assistant Examiner—Alyssa H. Bowler
Attorney, Agent, or Firm—Lewis H. Eslinger; Alvin Sinderbrand

[57] ABSTRACT

A master tape and a slave tape are driven so that successive portions of each are brought into substantial contact with successive portions of the other at a printing station. A printing magnetic field is applied to such successive portions while they are in substantial contact with each other at the printing station, so that data on the master tape is copied onto the slave tape and the slave tape becomes a copy of the master tape. A single master tape can thus be employed to produce a plurality of copies. A counter counts the number of copies thus produced, and an indicator provides an indication corresponding to the remaining life expectancy of the master tape.

10 Claims, 28 Drawing Figures

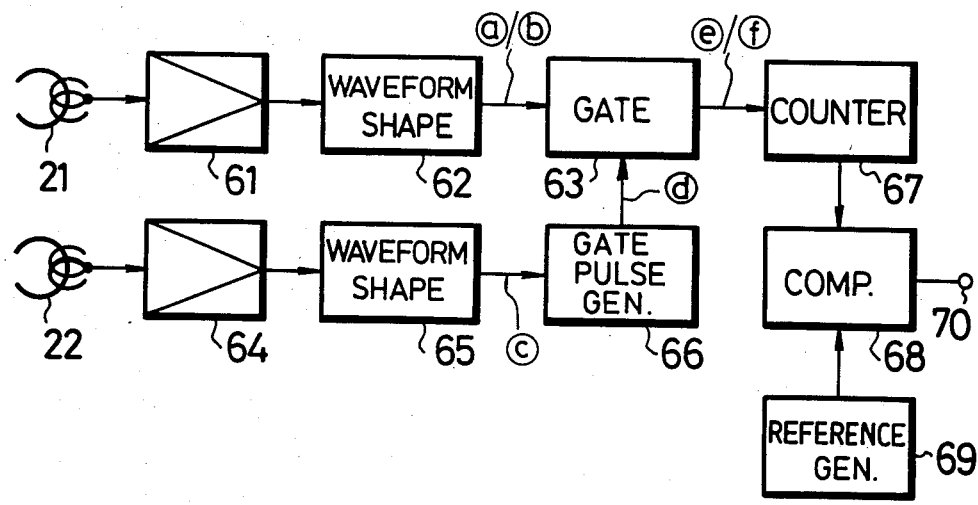
FIG. 7
FIG. 8A (β)
FIG. 8B (VHS)
FIG. 8C
FIG. 8D
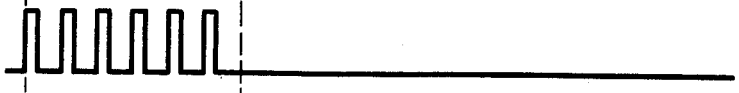
FIG. 8E (β)
FIG. 8F (VHS)

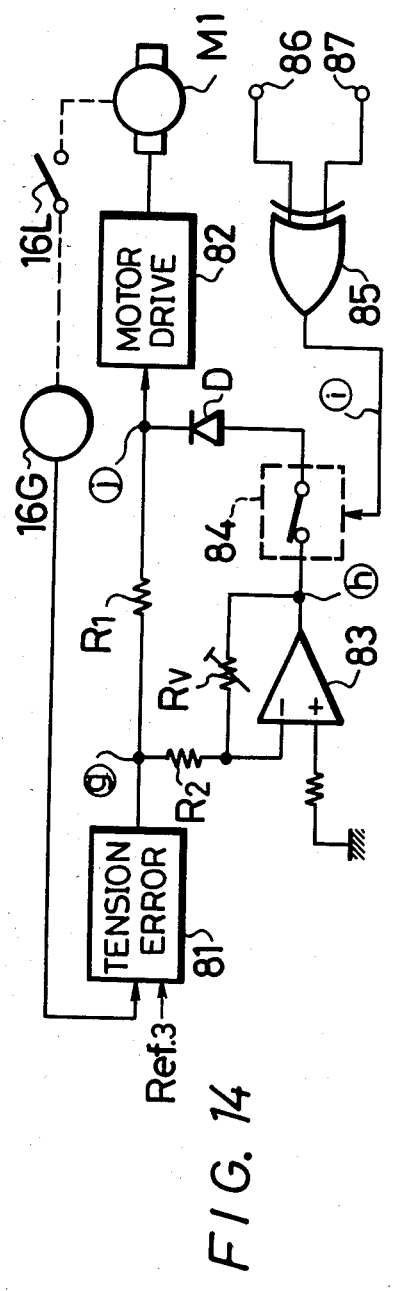
FIG. 14
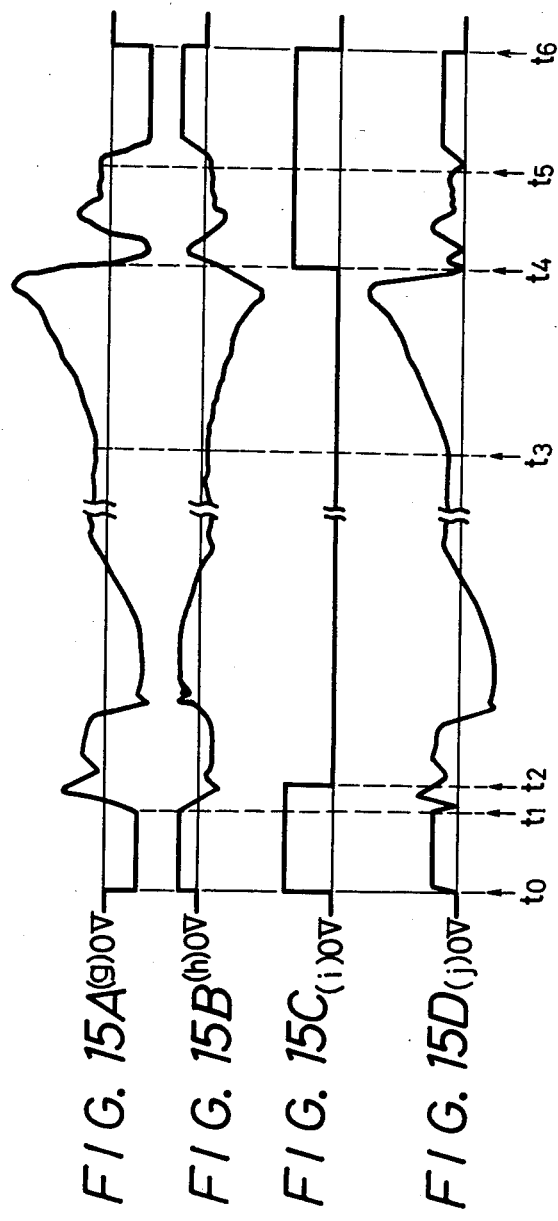
FIG. 15A (g) 0V
FIG. 15B (h) 0V
FIG. 15C (i) 0V
FIG. 15D (j) 0V

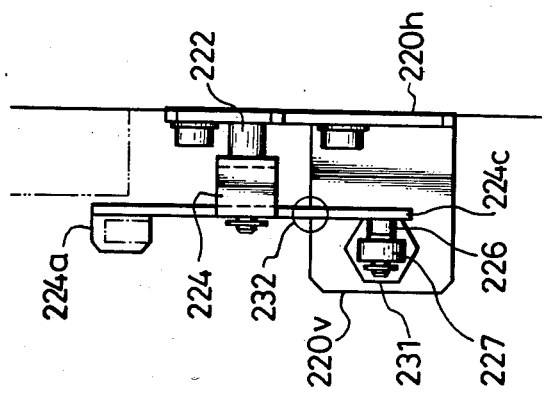
FIG. 20
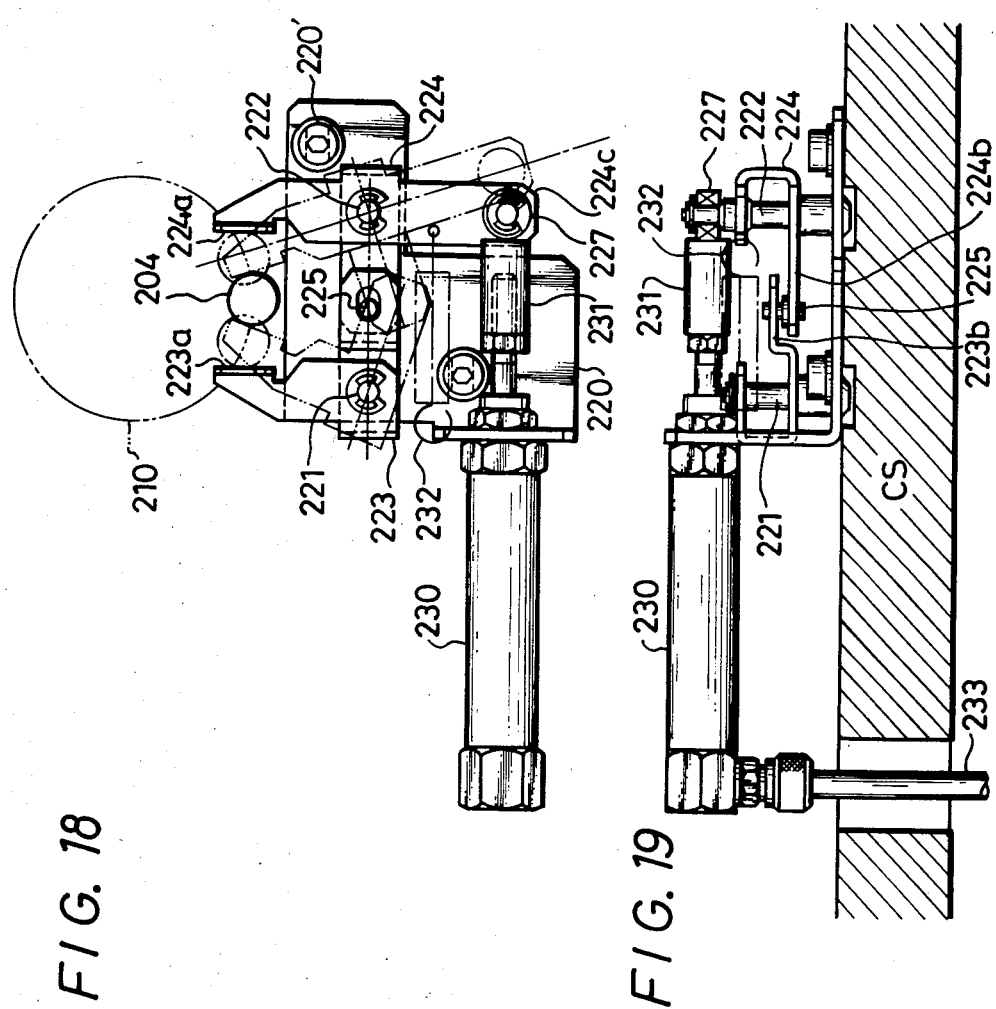
FIG. 18
FIG. 19

CONTACT PRINTING APPARATUS WITH PRESETTABLE MEANS INDICATING NUMBER OF COPY AND MASTER TAPE LIFE EXPECTANCY

BACKGROUND OF THE INVENTION

1. Field of the Invention

This invention relates to contact printing and, more particularly, to novel and highly-effective magnetic contact printing apparatus which can make a large number of copy tapes from a single master tape at high speed.

2. Description of the Prior Art

There are many types of conventional magnetic printing apparatus that can make copy tapes from a master tape. Typically, a magnetic surface of the master tape having mirror-image patterns recorded thereon is brought into contact with the magnetic surface of a slave tape, and the magnetic patterns of the master tape are printed on the slave tape by applying a magnetic printing bias field.

In magnetic contact printing, the quality of the copied tape is substantially reduced by any slippage between the master tape and the slave tape, any air film that may form between the master tape and the slave tape, any misalignment of the respective edges of the master tape and the slave tape, and so on. Further, the life expectancy (projected service life, or the number of copies that can be made) is limited by mechanical damage to the master tape. Accordingly, the tape transport system for both the master tape and the slave tape must be constructed to ensure that the tapes run smoothly without any appreciable positional displacement in the width direction thereof and with suitable tape tension and little fluctuation of the tape tension.

Furthermore, in order to supply prerecorded tapes to the market economically, it is necessary to reduce the printing time. As a result, the contact printing apparatus is required to drive the tapes at high speed, and a computer is required to control the tape drive.

The life expectancy or projected service life of a new master tape is several thousands of printings. At a printing rate of several tens of tapes per hour, the same master tape may be used continuously over several days before it is worn out. From a production control standpoint, it is desirable to keep track of a variety of data such as the total number of prints to be made, the number of tapes already printed, the number of additional prints that may be made during the remainder of the useful life of the master tape, etc.

OBJECTS AND SUMMARY OF THE INVENTION

An object of the invention is to provide contact printing apparatus that can make a large number of copy tapes of good quality from a master tape at high speed.

Another object of the invention is to provide contact printing apparatus that facilitates keeping track of various data useful from a production control standpoint.

According to an aspect of this invention, there is provided a contact printing apparatus for a magnetic tape; comprising: means defining a printing station; and means for running a master tape and a slave tape so that successive portions of each are brought into substantial contact with successive portions of the other at the printing station; the printing station means including means for applying a printing magnetic field to such successive portions while they are in substantial contact with each other at the printing station, so that data on the master tape is copied onto the slave tape and the slave tape becomes a copy of the master tape, whereby a single master tape can be employed to produce a plurality of copies; further comprising means for counting the number of copies thus produced; and indicating means for providing an indication corresponding to the remaining life expectancy of the master tape.

BRIEF DESCRIPTION OF THE DRAWINGS

A better understanding of these and other objects, features and advantages of contact printing apparatus according to the present invention will become apparent from the following detailed description of the preferred embodiment thereof, taken in conjunction with the accompanying figures of the drawings, wherein like reference characters designate like elements and parts, and wherein:

FIG. 7 and FIGS. 8A to 8F are respectively a block diagram and timing charts showing how two different ways in which master tapes are commercially recorded can be discriminated from each other in accordance with the present invention;

FIG. 14 is a block diagram of a tension servo control system employed on the supply reel side of a printing station in accordance with the present invention;

FIGS. 15A to 15D are respectively timing charts showing the operation of the tension servo system of FIG. 14;

FIGS. 18, 19 and 20 are respectively a plan view, a front view and a side view of an arm lock mechanism used in the present invention.

DESCRIPTION OF THE PREFERRED EMBODIMENT

Figure 1:
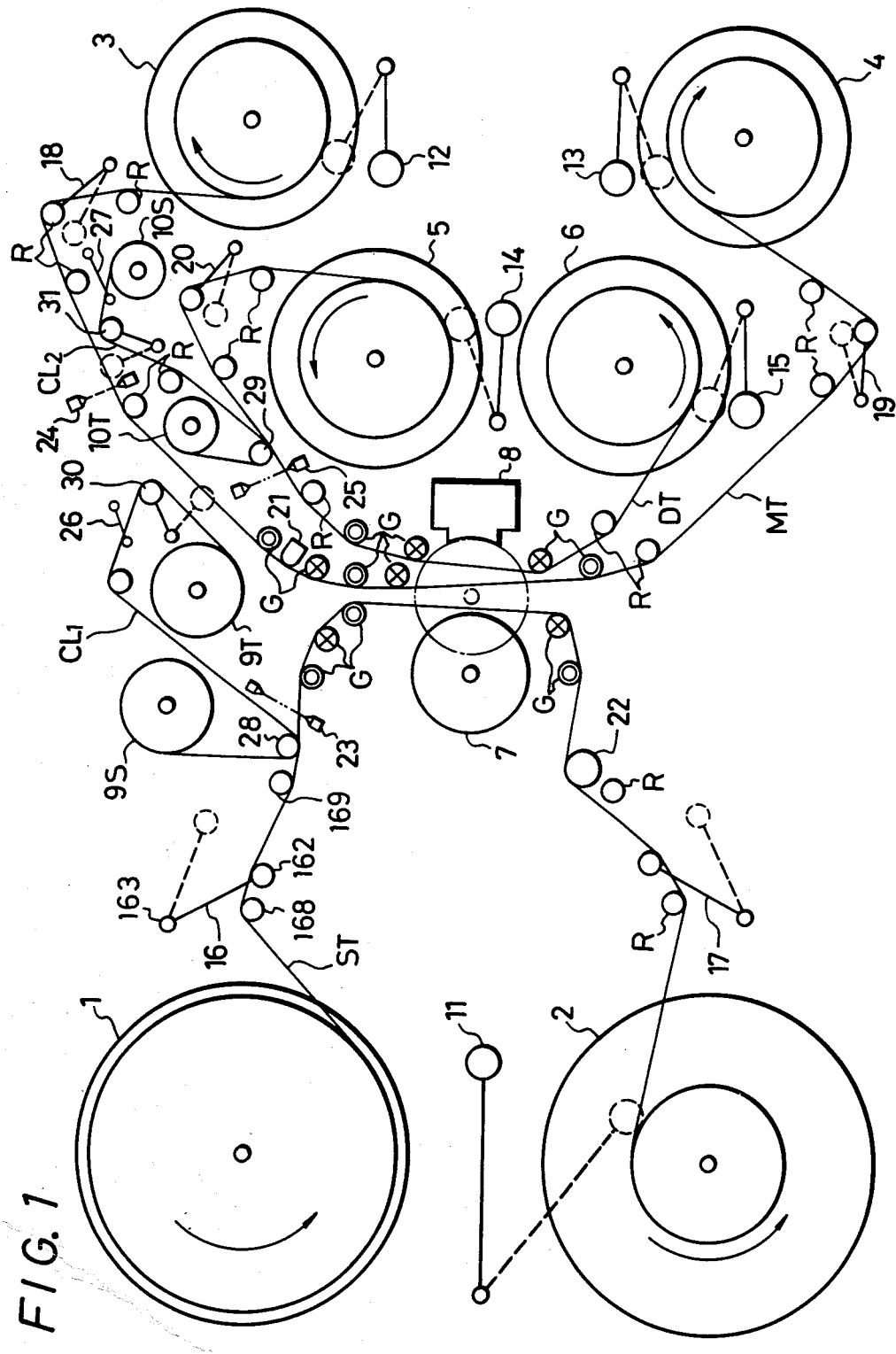
FIG. 1 is a diagram of a preferred embodiment of contact printing apparatus according to the present invention, showing its overall mechanical arrangement.

FIG. 1 schematically illustrates a preferred embodiment of contact printing apparatus according to the present invention, and particularly the mechanical arrangement of the tape transport system thereof.

Figure 5:
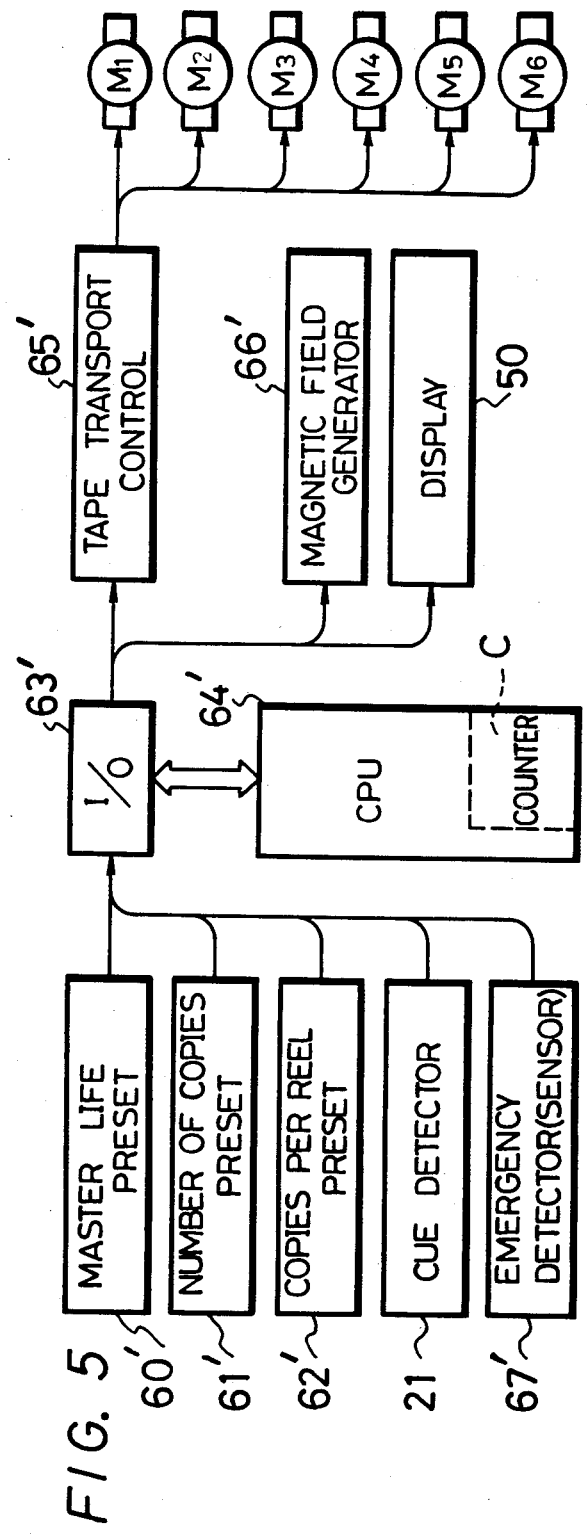
FIG. 5 is a function block diagram of a microcomputer used in the embodiment of FIG. 1.
Figure 10:
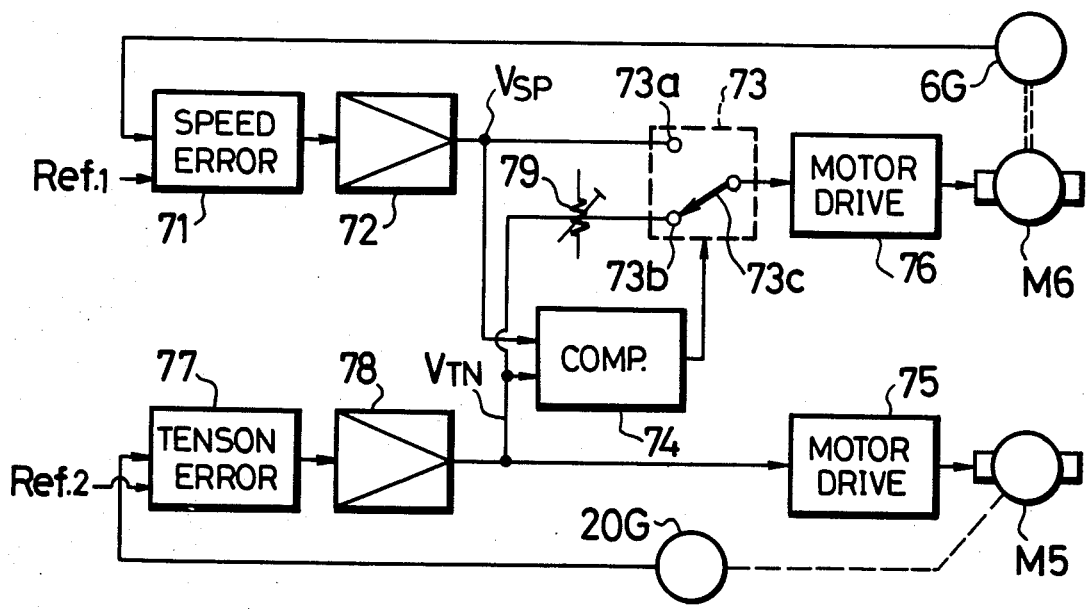

In FIG. 1, a slave tape ST is transported between a supply reel 1 and a take-up reel 2. The diameter of both of the supply reel 1 and the take-up reel 2 is about 27 cm. A master tape MT is transported between a supply reel 3 and a take-up reel 4, and a drive tape DT is transported between a supply reel 5 and a take-up reel 6. The diameter of each of the reels 3 to 6 is about 18 cm. The reels 1 to 6 have reel discs that are directly coupled to six AC torque motors M1 to M6, respectively (FIGS. 5, 10 and 14).

The reel disc of each of the reels 1 to 6 is provided with a parking brake (not shown) which prevents the tape from slackening when it stops running. The reel disc of each of the reels 3 to 6 for the master tape MT and the drive tape DT is further provided with a rotation detector (not shown) which detects the rotation direction and the revolution number of each reel so as to enable servo-control of the rotation speed of the reel motors. The rotation detector has a high resolution to produce several tens of pulses per revolution of each reel.

The slave tape ST uses $\gamma$-iron oxide containing cobalt (the coercive force Hc is substantially equal to 650 Oe) as a magnetic material. The width of the slave tape ST is 12.65 mm and the thickness thereof is about 20 $\mu$m. The equivalent of 13 rolls of a 120-minute video cassette of $\beta$-II mode (having half the tape speed of a normal $\beta$system) can be wound on the supply reel 1 in the form of a so-called pancake. Of course, the slave tape ST is cut at the cue signal point after printing. (The utility of the cue signal in accordance with the present invention is discussed in more detail below.) The master tape MT is a so-called metal tape in which pure iron (having a coercive force Hc substantially equal to 2000 Oe) is used as the magnetic material. The tape width is 12.65 mm, the tape thickness with a back coat is about 27 $\mu$m and the tape length is about 380 m. The drive tape DT is made of a base material with a back coat and is 12.65 mm in width, about 27 $\mu$m in thickness and about 430 m in length. The tapes ST, MT and DT are respectively supplied from the supply reels 1, 3 and 5 to the take-up reels 2, 4 and 6 as shown in FIG. 1.

In accordance with the invention, a printing station is provided comprising a rotatable transfer drum 7 mounted adjacent to a contact chamber 8. The transfer drum 7 is made of metal and has a static-pressure air bearing so that it rotates smoothly and with high precision. In modes other than the printing mode, as shown by a solid line in FIG. 1, the transfer drum 7 is remote from the contact chamber 8, and the three tapes ST, MT and DT are spaced apart from one another. In the printing mode, the transfer drum 7 is moved to the right (as viewed in FIG. 1) by an air cylinder (not shown) into closely spaced apart relation to the contact chamber 8. The position of the transfer drum 7 in the printing mode is shown by a one-dot chain line in FIG. 1. The three tapes ST, MT and DT are then urged against one another and the transfer drum 7 by air compressed within the contact chamber 8 to a pressure of 4 kg/cm$^2$ and released against the right side (FIG. 1) of the drive tape DT. To avoid slippage of the drive tape DT, the non-coated (left) surface of the drive tape DT and the back-coated (right) surface of the master tape MT come into close contact with each other. A bias head (not shown in FIG. 1) is disposed inside the contact chamber 8 and applies a predetermined printing magnetic field to the tapes to print the magnetic patterns of video, audio and control signals of the master tape MT simultaneously onto the slave tape ST.

In the printing mode, the three tapes in close contact with one another, namely the master tape MT, the slave tape ST and the drive tape DT, are moved together by the reel motor M6 of the drive tape DT. The reel motor M6 of the drive tape DT is servo-controlled for speed, while the reel motor M5 of the supply reel 5 and the reel motors M1 to M4 of the reels 1 to 4 for the master tape MT and the slave tape ST are respectively servo-controlled in such a manner that the tension on each tape remains substantially constant.

Tape pressure rollers 11 to 15 respectively cooperate with reels 2 to 6. The tape pressure rollers 11, 13 and 15 are respectively adapted to prevent air from entering between the layers of tape formed on each of the take-up reels 2, 4 and 6 upon winding. Since the master tape MT and the drive tape DT are moved reciprocally (i.e., first in one direction and then in a second direction opposite to the first), the reels 3 and 5 are respectively provided with the tape pressure rollers 12 and 14.

In the printing mode, tension arms 16 to 20 are respectively positioned as shown by broken lines in FIG. 1 and detect the tension in the several tapes to facilitate a tension servo control as described below. The tension arms 16 to 20 are respectively locked in positions shown by solid lines in FIG. 1 in the tape loading mode (stop mode).

A cue signal playback head 21 makes contact with the back surface of the master tape MT and detects a start cue signal and an end cue signal (for example, sine wave signals of 65 Hz with a duration of two seconds) that are recorded on the master tape MT. The start cue and end cue signals are used to control the tape transport system and to discriminate the recording format (i.e., $\beta$ or VHS) of the master tape MT. A roller 22 mounted on the take-up side of the slave tape ST (i.e., between the printing station formed by the transfer drum 7 and the contact chamber 8, and the take-up reel 2) detects the tape running speed and the print length on the basis of the rotation speed and the revolution number thereof.

Tape sensors 23 to 25 each comprising, for example, a photo coupler (i.e., a light source and a photoelectric cell) are respectively mounted in positions such that they detect whether or not the slave tape ST, the master tape MT and the drive tape DT are properly trained between their respective supply and take-up reels 1, 2; 3, 4; and 5, 6. In particular, the sensors 23 to 25 detect whether or not the leading ends of the tapes ST, MT and DT have been removed from the respective supply reels 1, 3 and 5 and properly threaded, and whether or not the trailing ends of the tapes have run out (i.e., have run past the respective sensors 23, 24 and 25).

First and second cleaning tapes CL$_1$ and CL$_2$ respectively extend between supply and take-up reels 9S, 9T and supply and take-up reels 10S, 10T under tension as shown in FIG. 1. Rollers 28 and 29 respectively urge the cleaning tapes CL$_1$ and CL$_2$ against the surfaces of the slave tape ST and the drive tape DT. When the master tape MT is rewound, movable rollers 30 and 31 urge both cleaning tapes CL$_1$ and CL$_2$ against the front and back surfaces, respectively, of the master tape MT. The cleaning tapes CL$_1$ and CL$_2$ are wound incrementally as may be necessary between successive uses thereof so that fresh portions of the cleaning tapes are used in every cleaning operation. Tape sensors 26 and 27 are respectively provided to sense the end of each tape $CL_1$ and $CL_2$ by mechanically detecting the decrease of the tape tension.

As FIG. 1 shows, a plurality of tape guides are provided along the paths of the respective tapes. In the vicinity of the printing station including the transfer drum 7 and contact chamber 8, where it is necessary to restrict the tape position with a close tolerance, tape guides G made of alumina and having high resistance to wear are employed. The tape guides G respectively restrict the lower edge or upper edge of the tapes, as shown by a symbol ⓧ or ⓞ. The portion of each tape guide G in contact with the tape is made of titania or titanate dioxide and has a smooth surface and good electrical conductivity to discharge static electricity from the tapes. Farther from the printing station including the transfer drum 7 and contact chamber 8, where it is not necessary to restrict the tape position with such a close tolerance, guide rollers R having ball bearings are used as tape guides. To protect the master tape MT from wear so as to prolong its service life, the magnetic surface of the master tape MT (i.e., the left surface thereof adjacent to the printing station including the transfer drum 7 and contact chamber 8 in FIG. 1) does not make contact with any of the tape guides.

Figure 2:
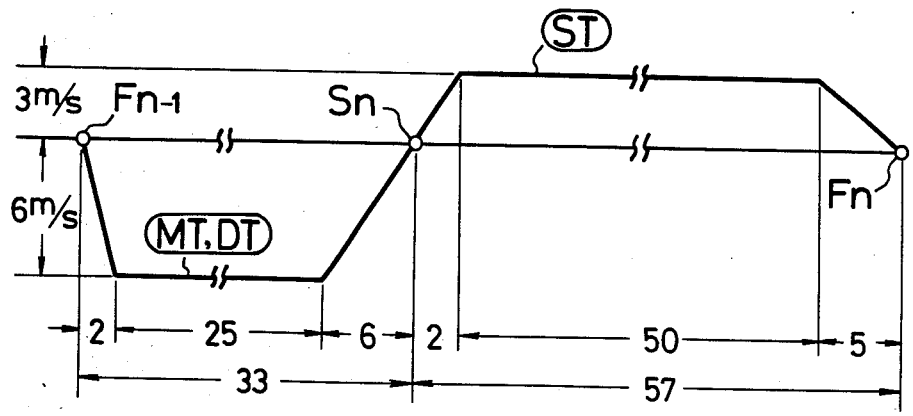
FIG. 2 is a diagram showing the running state of a tape in the embodiment of FIG. 1 as a function of time.

FIG. 2 shows as a function of time the tape running state of the embodiment of FIG. 1. At a time $F_{n-1}$, when the tape stops running after (n−1)-th printing has been completed, the rewinding of the master tape MT and the drive tape DT begins; after two seconds (measured along the abscissa), the tape speed reaches six m/sec (measured in the negative direction along the ordinate). This tape speed is maintained for 25 seconds. Then the tape is decelerated for six seconds and stopped at time $S_n$. In this way, a master tape MT containing a program that plays for 120 minutes in $\beta$II mode is fully rewound. The n-th printing then begins at time $S_n$. During the printing operation, the three tapes MT, ST and DT are in close contact with one another and reach a speed of three m/sec (i.e., 150 times greater than that in the $\beta$II mode) two seconds after time $S_n$. This speed is measured in the positive direction along the ordinate. The tape is kept running at this tape speed (three m/sec) for fifty seconds, decelerated for five seconds and then stopped at time $F_n$. Accordingly, in this embodiment, it takes one minute and thirty seconds to print a tape that plays for 120 minutes in the $\beta$II mode.

Figure 3:
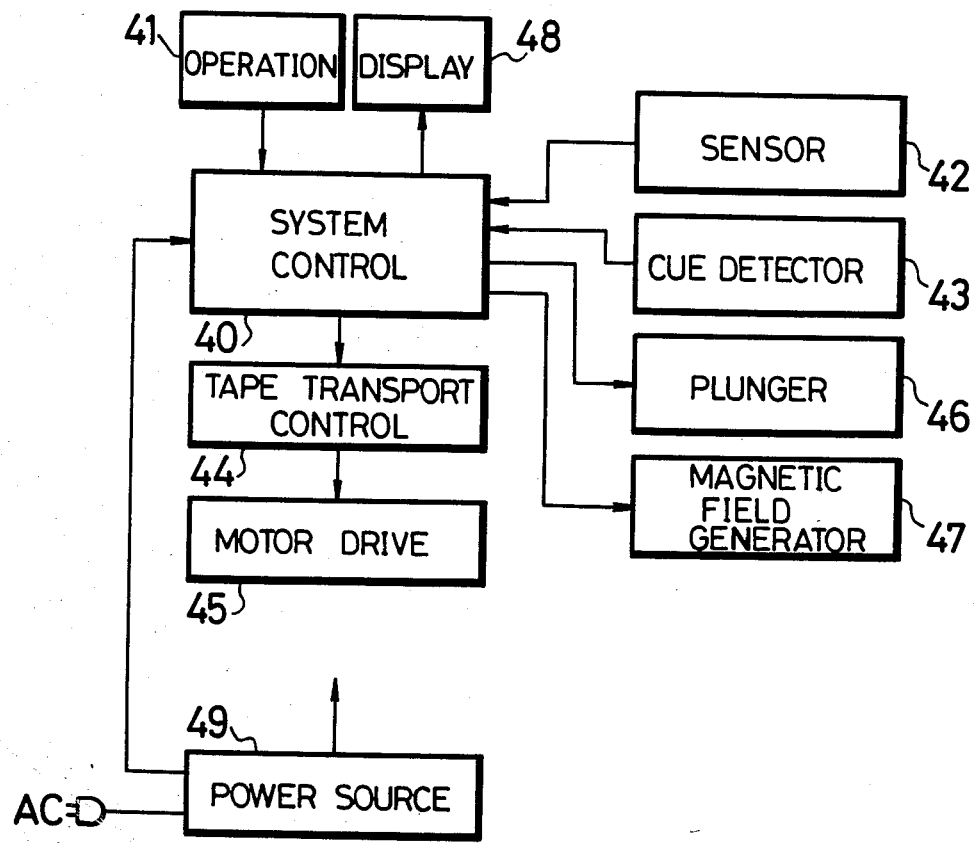
FIG. 3 is a block diagram showing an electrical system facilitating operation of the embodiment of FIG. 1.

The cue signal recorded on the master tape MT is used to control the running of the tape. FIG. 3 is a block diagram of electrical circuitry included in this embodiment of the invention. A system control section 40 includes a microcomputer and receives various kinds of information from an operation section 41, a sensor section 42 and a cue detecting section 43 and supplies a control signal to a tape transport control section 44 which controls a motor drive section 45. The system control section 40 also supplies a control signal to a plunger section 46 by which a brake member and an air cylinder are operated as required. In the printing mode, the system control section 40 supplies a control signal to a printing magnetic field generating section 47. A display section 48 digitally displays various preset values of the apparatus and various kinds of data such as the remaining life expectancy of the tape and includes various kinds of alarms, etc. A power source section 49 is also provided to supply power to each section of the apparatus.

Figure 4:
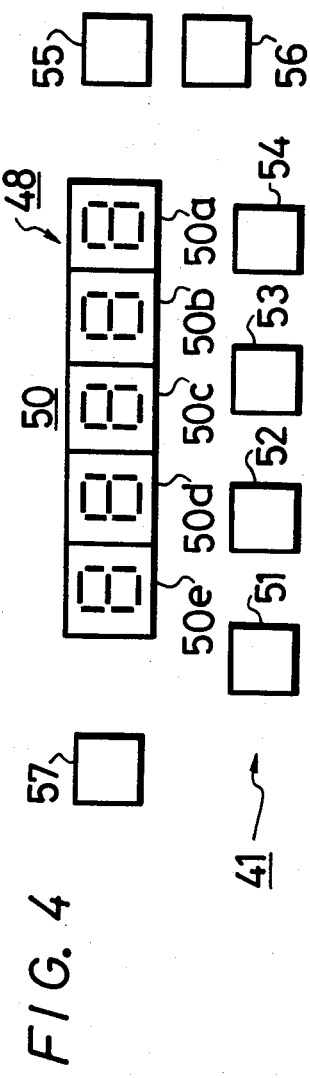
FIG. 4 is a diagram schematically illustrating a control and display panel used in the embodiment of FIG. 1.

FIG. 4 illustrates a main part of the above-described operation section 41 and display section 48. A character display 50 comprises five display elements 50a, 50b, 50c, 50d and 50e. These display elements respectively display the digits of a five digit number from the least significant digit (LSD) to the most significant digit (MSD). A copy length switch 51 causes the display 50 to display the length of one roll of a copy tape. The displayed value is available for setting a tape winder which is operated in cooperation with the contact printing apparatus of the invention. A master life switch 52, a print total switch 53 and a copies-per-reel switch 54 are respectively used to preset the service life of the master tape MT, the desired number of the copy rolls and the number of copy rolls per pancake. A select switch 55 and a set switch 56 are employed as described below to set the above-described values, and an initial value set switch 57 is employed to cause display of various initial values.

Values are set in the following manner. First, the set switch 56 is depressed. Then, if, for example, the master life switch 52 is depressed, in order to set the desired service life of the master tape MT into the apparatus, all digits in the character display 50 become zeroes and the display element 50e for the most significant digit begins to blink. When the select switch 55 is depressed, the blinking numerical value displayed in display element 50e begins to step integer by integer through 1, 2, 3, etc. When the desired value for the most significant digit is reached, the select switch 55 is released and the set switch 56 is depressed to set the desired value. Then, the display element 50d for the next lower digit begins to blink and is stepped and set in like manner. In the same way the values of successive digits are stepped and set down to the least significant digit in display element 50a.

In the printing mode of the contact printing apparatus, the number of rolls copied is normally displayed by the character display 50. If the initial value set switch 57 is depressed and then the master life switch 52 is depressed, the initial set value indicative of the service life of the master tape MT is displayed for several seconds. To learn the remaining life expectancy of the master tape MT, the master life switch 52 is depressed by itself, without first depressing the initial value set switch 57. The projected remaining service life of the master tape MT is then displayed by the character display 50 for several seconds. In this manner, it is possible to check various initial and current data relating to production control at any time.

When any of certain abnormalities arise during the operation of the contact printing apparatus, the symbol "E" is displayed by the display element 50e of the most significant digit of the character display 50, and an alarm code is displayed by, for example, the display elements 50a and 50b of the last two digits. When a plurality of abnormalities occur at the same time, the symbol "E" blinks in the display element 50e. In this case, the several alarm codes are displayed in turn by depressing the select switch 55, so that all of the alarms can be learned.

Figure 6:
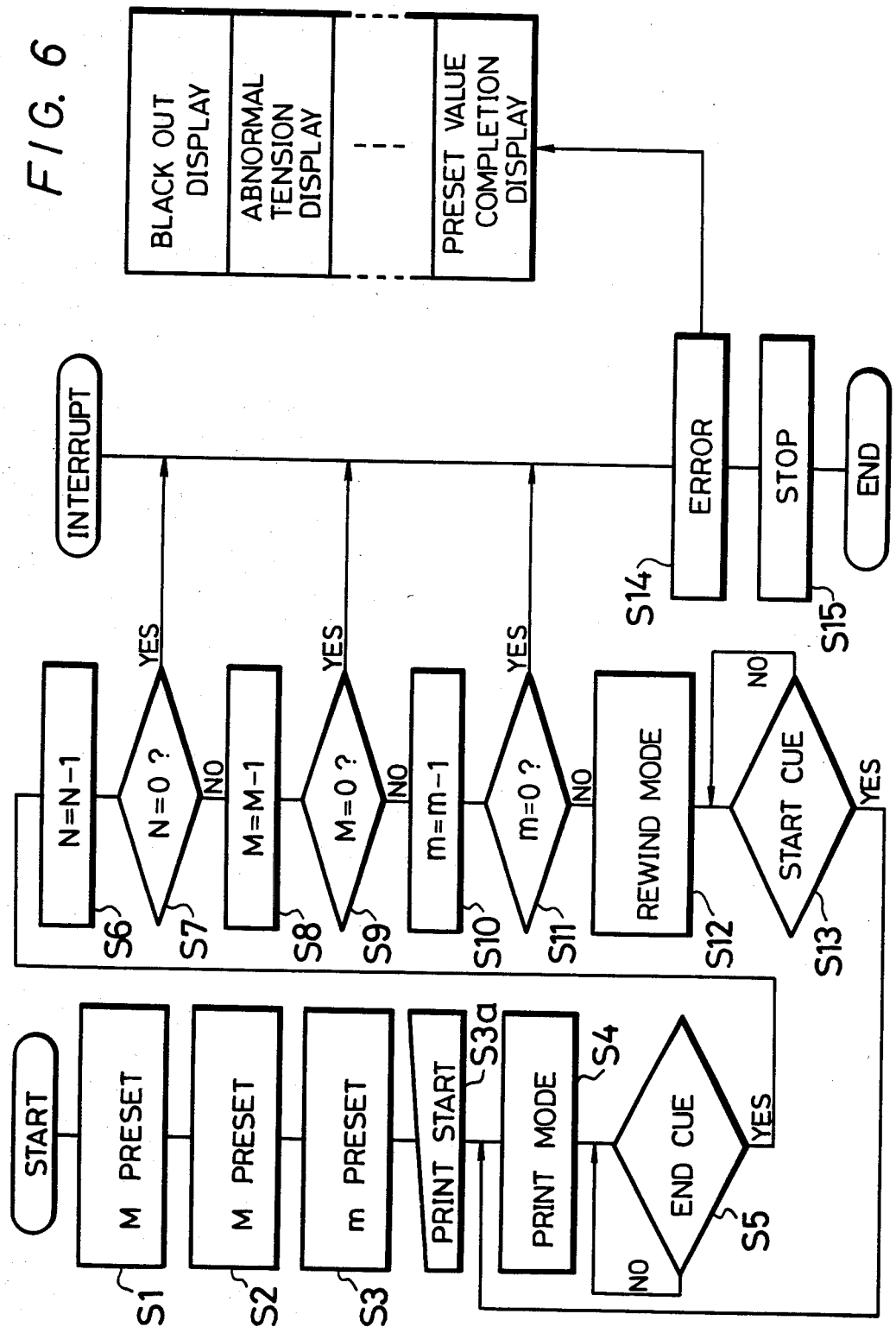
FIG. 6 is a flow chart showing the operation of the microcomputer of FIG. 5.

FIGS. 5 and 6 facilitate an understanding of the operation of the embodiment of the contact printing apparatus described above.

In steps S1 to S3 in the flow chart of FIG. 6, using a "master tape life" setting means 60' (FIG. 5), a "total number of copies" setting means 61' and a "copies per reel" setting means 62', the service life of the master tape (N times), the desired number (M) of prints and the number (m) of copies per reel are respectively set through an I/O interface 63' to the counter C in a central processing unit (CPU) 64' of the microcomputer. Each of the setting means 60', 61' and 62' includes a portion of the structure described above in connection with FIG. 4. For example, the master tape life setting means 60' includes the master life switch 52 plus the select switch 55 and set switch 56. The latter two switches are common to all of the setting means 60', 61' and 62'.

By the print start operation (step 3a in FIG. 6), the contact printing apparatus is placed in the print mode (step S4), and the CPU 64' (FIG. 5) supplies control signals through the I/O interface 63' to the tape transport control means 65' and the printing magnetic field generating means 66'. The printing magnetic field generating means 66' enables the bias head in the contact chamber 8 to apply a predetermined printing magnetic field to the tapes as successive portions thereof pass through the printing station. When the first printing is completed, the cue signal detecting means 21 (FIGS. 1, 5 and 7) detects the end cue signal that is recorded on the master tape MT (step 5 in FIG. 6). Then, in steps S6 to S11, the initial set values of N, M and m are decremented by 1, and a determination is made whether or not each of the decremented values of N, M and m is zero. If all decremented values remain positive, the contact printing apparatus is placed in the rewind mode (step S12). At this time, the printing magnetic field generating means 66' (FIG. 5) is disabled and the tape transport control means 65' is operated by a control signal from the CPU 64' so as to rewind the master tape MT and the drive tape DT. When the rewind of the master tape MT and the drive tape DT is completed, the start cue signal of the master tape MT is detected (step S13 in FIG. 6) by the cue signal detecting means 21 (FIGS. 1, 5 and 7). The program then loops back to step S4 (FIG. 6), and the contact printing apparatus is once again set in the printing mode.

After these operations are repeated a number of times, the decremented value of, for example, the number (m) of copies per reel becomes zero, a condition detected at step S11 in FIG. 6. The contact printing apparatus is then placed in an error mode (step S14 in FIG. 6). An alarm code signal from the CPU 64' (FIG. 5) is then supplied to the display means 50 (FIGS. 4 and 5), which then displays thereon the alarm code, and a control signal is supplied to the tape transport control means 65', which stops the tape and places the contact printing apparatus in the stop mode (step S15). Similar steps are carried out when the decremented values of the master tape life N and of the remaining desired number M of prints become zero (steps S7 and S9, respectively).

In case of an accident (an instantaneous power failure or tension abnormality, etc.), a detecting signal from the emergency or abnormality detecting means 67' (FIG. 5) is generated, and an alarm code signal corresponding to such abnormality is supplied from an alarm display ROM (read only memory, not shown) to the display 50 (FIGS. 4 and 5), which displays the alarm code as described above.

While in the embodiment described above the cue signal recorded on the master tape MT and detected by the cue signal playback head 21 (FIGS. 1, 5 and 7) is counted by a subtracting counter, it is possible to use an adding counter. In either case, the counter is set to a given initial value and continuously maintains a count that is an indication of the remaining service life of the master tape MT, etc., as explained above.

Since the tape playing speed of a $\beta$ system is 20 mm/sec and that of a VHS (video home service) system is 32 mm/sec, the length of the tape on which the cue signal is recorded differs in the $\beta$ and VHS recording systems. In other words, the frequency of the cue signal per unit length of the master tape MT differs in the two systems. Accordingly, when the printed tape is transported at a constant speed (for example when the cut portion of the print is detected or the print is rewound by the tape winder), the $\beta$ system and the VHS system can be discriminated from each other by the difference between the frequencies of the cue signals thereof.

The block diagram of FIG. 7 and timing charts of FIGS. 8A to 8F illustrate a way of discriminating the $\beta$ recording system and the VHS recording system from each other in the contact printing apparatus of the present invention shown in FIG. 1.

In FIG. 7, the output from the cue signal reproducing head 21 (i.e., the reproduced cue signal) is supplied through an amplifier 61 to a waveform shaping circuit 62. An output ⓐ or ⓑ (as shown in FIG. 8A or 8B) produced by the waveform shaping circuit 62 is supplied to a gate 63. The output from the detector 22' associated with the roller 22 of FIG. 1 (i.e., the tape length inspection signal) is supplied through an amplifier 64 to a waveform shaping circuit 65. A signal ⓒ (shown in FIG. 8C) from the waveform shaping circuit 65 is supplied to a gate pulse generating circuit 66 which then produces a constant length signal ⓓ (shown in FIG. 8D) of a pulse width equal to one cycle Tm of the tape length inspection signal, which is proportional to a predetermined length of the tape. The gate 63 is supplied with the gating signal ⓓ, which has predetermined length. The gate 63 is opened only during the period Tm (FIG. 8D) so that, as FIGS. 8E and 8F show, the gate 63 supplies the pulses of the output ⓐ or ⓑ from the waveform shaping circuit 62 during the occurrence of the signal ⓓ to a pulse counter 67 as the output ⓔ or ⓕ. The output of the pulse counter 67 is a DC signal which is supplied to a comparator 68 in which it is compared with the output of a reference voltage generator 69. The comparator 68 produces an output at an output terminal 70 in accordance with the comparison thus made.

As the preceding description makes clear, FIGS. 8A and 8E correspond to the $\beta$ system, while FIGS. 8B and 8F correspond to the VHS system. Since the ratio of the number of the pulses supplied to the pulse counter 67 in the two cases is about 3:2, it is easy to discriminate the $\beta$ system and the VHS system from each other by the output of the comparator 68.

Figure 9:
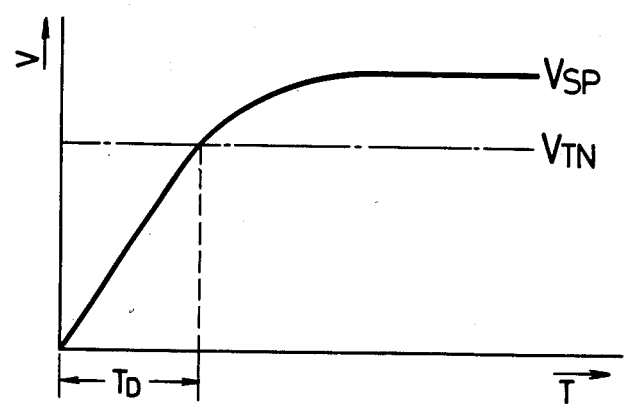
FIGS. 9 and 10 are respectively a graph and a block diagram showing the operation and structure of a tape drive control system in accordance with the present invention.

FIGS. 9 and 10 illustrate the operation and structure of a transport control for the drive tape DT.

The drive tape DT for driving both the master tape MT and the slave tape ST is moved in the forward direction by the take-up reel motor M6 that is servo-controlled for speed. At the same time, the drive tape DT is given a predetermined back tension by the supply reel motor M5. The back tension is produced by a tension servo control using as a sensor a potentiometer coupled to the tension arm 20 (FIG. 1) positioned in the vicinity of the supply reel 5. In the stop mode of the apparatus, the tension arm 20 is mechanically locked. When the tape runs at normal speed, the potentiometer supplies to the tension servo system a signal voltage $V_{TN}$ (FIG. 9) which produces the necessary back tension. The control voltage $V_{TN}$ of the tension servo system maintains a nearly constant value.

A control voltage $V_{SP}$ (FIG. 9) of the forward speed servo system rises from an initial "0" and reaches a predetermined value greater than $V_{TN}$ and corresponding to a predetermined forward tape transport speed.

As FIG. 9 makes clear, during the initial rise time TD, the control voltage $V_{TN}$ of the back tension servo system is higher that the control voltage $V_{SP}$ of the forward speed servo system. As a result, upon start-up, the torque of the supply reel motor M5 is initially much larger than that of the take-up reel motor M6 so that the motor M5 urges the motor M6 to rotate in the reverse direction through the drive tape DT.

A mechanical brake may of course be employed to prevent the take-up reel motor M6 from being rotated in the reverse direction. However, such a brake has the drawback that it tends to be mechanically unstable when it is released and is difficult to release at precisely the right moment and that its brake shoe becomes worn by the frequent operations.

FIG. 10 is a block diagram of the tape transport control apparatus used in the contact printing apparatus of the invention shown in FIG. 1. In FIG. 10, reference numeral 71 designates a speed error detecting circuit. The detecting circuit 71 compares the rotation detecting signal supplied from a rotation detector 6G coupled to the take-up reel motor M6 with a reference value Ref 1 and produces a speed servo control signal $V_{SP}$ corresponding to the difference therebetween. The speed servo control signal $V_{SP}$ is amplified by an amplifier 72 and then supplied to one fixed contact 73a of an electronic switch 73 and to a comparator 74. Motor driving circuits 75 and 76 respectively drive the supply reel motor M5 and the take-up reel motor M6. A movable contact 73c of the electronic switch 73 is connected to the motor driving circuit 76. A tension error detecting circuit 77 compares the tension detecting signal supplied from a tension sensor 20G associated with the supply reel motor M5 through the tension arm 20 (FIG. 1) and the drive tape DT (FIG. 1) with a reference value Ref 2 and produces a tension servo control signal $V_{TN}$ corresponding to the difference therebetween. The tension servo control signal $V_{TN}$ is amplified by an amplifier 78 and then supplied to the comparator 74 and the motor driving circuit 75 and through a level adjuster 79 to the other fixed contact 73b of the electronic switch 73. The output from the comparator 74 is supplied to the electronic switch 73 as the control signal thereof.

During the time period TD (FIG. 9) following actuation, the forward speed servo control voltage $V_{SP}$ is less than the back tension servo control voltage $V_{TN}$ and the electronic switch 73 is placed in the connection state shown in FIG. 10 by the output "0" of the comparator 74. Thus, the motor driving circuit 76 for driving the take-up reel motor M6 is temporarily supplied with the tension servo control signal $V_{TN}$ through the level adjuster 79 and the electronic switch 73. During this period, the level adjuster 79 is adjusted so as to maintain an appropriate relationship between the torques developed by the reel motors M5 and M6, so that there is no risk that the take-up reel motor M6 will be rotated in the reverse direction. The take-up reel motor M6 then starts to rotate smoothly in the forward direction and accelerates to the normal running speed.

When the time period TD has passed and the forward speed servo control voltage $V_{SP}$ becomes equal to or greater than the back tension servo control voltage $V_{TN}$, the output of the comparator 74 becomes "1" so that the electronic switch 73 is changed to the position opposite that shown in FIG. 10 (i.e., the contact arm 73c closes with the contact 73a instead of closing with the contact 73b), thereby to close the speed servo loop of the take-up reel motor M6. Accordingly, both when the tape starts to run and when the tape reaches normal running speed, there is no risk that abnormal tension will be applied to the tape.

Figure 11:
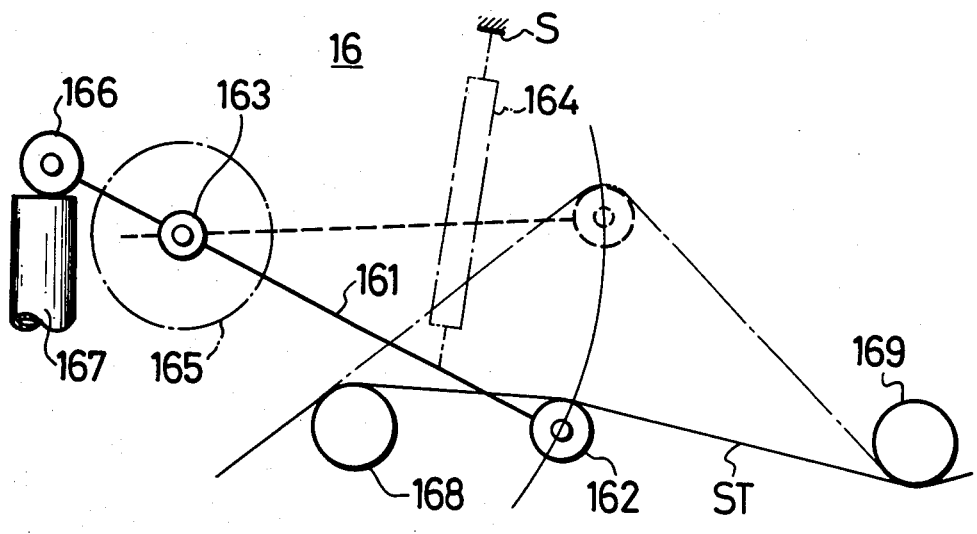
FIG. 11 is a schematic diagram of a tension arm used in the apparatus of the present invention.

FIGS. 11 to 15 show the tension servo control for the slave tape ST. FIG. 11 is a schematic diagram of the tension arm 16 of FIG. 1. As FIG. 11 shows, an arm member 161 is provided at one end with a tension roller 162 and is rotatable around a support shaft 163. A tension spring 164 is stretched between the arm member 161 and a suitable fixed support S. When the slave tape ST runs at normal speed, at the position of the arm 161 and the roller 162 shown by the broken line, the biasing force of the tension spring 164 is balanced with the tape tension. A potentiometer 165 is coupled to the support shaft 163 and produces as the tension detecting signal a voltage corresponding to its rotation angle. The arm member 161 is provided at the other end with a roller 166. When the tape stops running, an air cylinder 167 presses the roller 166 to lock the tension arm 16 with the roller 166 positioned as shown in solid outline in FIG. 11. At this time, the slave tape ST forms nearly a straight line between training rollers 168 and 169.

When the slave tape ST starts to run, the tension arm 16 is released from its locked position, and the arm member 161 is rotated in the counterclockwise direction by the tension spring 164 so that the roller 162 pulls the slave tape ST up so that it follows a course between the rollers 168 and 169 shown by the dash-dot line, and the slave tape ST never becomes slack. Conversely, when the slave tape ST stops running, the air cylinder 167 presses against the roller 166 to cause the arm member 161 to rotate in the clockwise direction from the position shown by the broken line, so that the roller 162 and the course of the slave tape ST between the rollers 168 and 169 assume the positions respectively shown in solid outline in FIG. 11.

Figure 12:
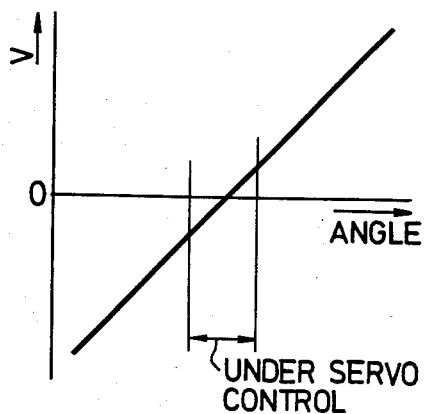
FIGS. 12 and 13 are graphs of a control voltage as a function of the angular position of a sensor in a tension servo control system for a slave tape in the present invention.
Figure 13:
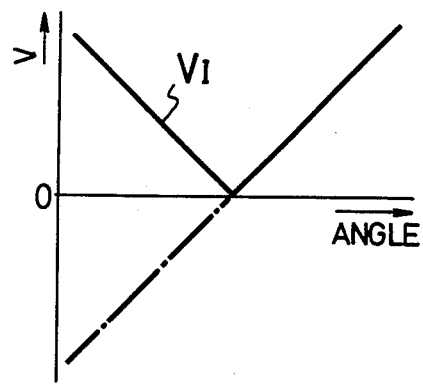

When the slave tape ST is servo-controlled for tension, the arm member 161 (sensor) rotates in accordance with the tape tension. As shown in FIG. 12, as the position (angle) of the sensor moves from the center of the servo range in the positive or negative direction (the direction of rotation which causes the servo control to increase the tape tension, or the counterclockwise direction, is taken as the positive direction), the voltage supplied to the reel motor varies to restore the predetermined tape tension.

In the tension arm 16 as seen in FIG. 11, when the tape tension is increased, the arm member 161 rotates in the clockwise direction, and the tension detecting signal from the potentiometer 165 operates the servo system so as to decrease the tape tension accordingly.

When the slave tape ST stops running, the tension arm 16 is locked by the air cylinder 167 so that the tape forms nearly a straight line between the rollers 168 and 169, as indicated above. It is undesirable in such a case that the tension servo system should cause the tape ST to become slack. This problem is avoided by inverting the polarity of the tension servo control voltage when the tension arm 16 is locked. The inversion of polarity of the tension servo control voltage is shown by the graph segment $V_I$ in FIG. 13.

FIG. 14 schematically illustrates an arrangement of the tension servo system for the supply reel side. In FIG. 14, a tension error detecting circuit 81 compares a tension detecting signal supplied from a tension sensor 16G with a reference value Ref 3 and produces a tension servo control signal ⓖ corresponding to the difference therebetween. The tension sensor 16G is associated with the slave tape ST and supply reel motor M1 through the tension arm 16 (FIG. 1). The control signal ⓖ is supplied through a resistor $R_1$ to a motor driving circuit 82 and through a resistor $R_2$ to the inverting input terminal of an amplifier 83. An inverted output ⓗ of the amplifier 83 is adjusted to a predetermined level by a variable resistor Rv and fed through an electronic switch 84 and a diode D to the motor driving circuit 82. To input terminals 86 and 87 of an exclusive-OR circuit 85, there are respectively supplied parking brake control signals for the supply reel motor M1 and the take-up reel motor M2. When one but only one of the brake control signals is high, the electronic switch 84 is closed by an output ⓘ of the exclusive-OR circuit 85. A limit switch 16L opens when the tension arm 16 is locked by the air cylinder 167 shown in FIG. 11.

In the stop mode, the tension arm 16 is locked and both brake control signals are turned on. At time $t_0$ (FIG. 15), when a start button is depressed, the suply reel side brake control signal is turned off, and the switch 84 is closed by the output ⓘ of the exclusive-OR circuit 85. Since the tension arm 16 is locked, the output ⓖ of the tension error detecting circuit 81 has a negative polarity as shown in FIG. 15A so that the motor M1 tends to rotate the supply reel in the tape supplying direction. However, the inverted output ⓗ, as shown in FIG. 15B, from the amplifier 83 is supplied through the switch 84 and the diode D to the motor driving circuit 82 so that, as shown in FIG. 15D, the input signal ⓙ thereof becomes positive. The motor M1 is thus rotated in the tape take-up direction and a predetermined tape tension is applied to the tape.

At a time $t_1$ which follows time $t_0$ by a predetermined interval, the tension arm 16 is released from its locked position, and the output ⓖ of the tension error detecting circuit 81 begins swinging from negative to positive in polarity. Accordingly, the inverted output ⓗ from the amplifier 83 swings from positive to negative in polarity. However, the negative polarity portion thereof is blocked by the diode D so that, until time $t_2$, when the take-up side brake control signal is turned off, the input ⓙ to the motor driving circuit 82 remains positive in polarity.

After the time $t_2$, the switch 84 is opened to allow the output ⓖ of the tension error detecting circuit 81 to be supplied "as is" to the motor driving circuit 82 so that the tape is transported while being normally servo-controlled for tension.

If the stop button is depressed, as indicated at time $t_3$, the tape is decelerated so that the output ⓖ of the tension error detecting circuit 81 is increased in the positive direction. The output ⓖ drops to zero at time $t_4$, when the deceleration ends. At this time, the take-up reel side brake control signal is turned on, the take-up reel motor is braked, the output ⓘ of the exclusive-OR gate 85 becomes high, and the switch 84 is closed. At a time $t_5$ which follows time $t_4$ after a predetermined interval, the tension arm 16 is locked. Although the output ⓖ of the tension error detecting circuit 81 becomes negative, the switch 84 is closed so that the inverted output ⓗ positive polarity from the amplifier 83 is supplied through the diode D to the motor driving circuit 82. The motor M1 is thus first urged in the direction for applying a predetermined tape tension to the tape and then stopped. At a succeeding time $t_6$, the supply reel side brake control signal is turned on, the supply reel motor M1 is braked, and the output ⓘ of the exclusive-OR gate 85 becomes low. The signals ⓖ, ⓗ, ⓘ, and ⓙ of FIGS. 15A through 15D, respectively, are thus all returned to their initial conditions (i.e., to their conditions just before time $t_0$).

In this way, since the tension arm 16 is locked and released from locking under the condition that the slave tape ST is maintained under a predetermined tape tension, the slave tape ST starts running smoothly. Further, when the tension arm 16 is locked, the slave tape ST is extended substantially rectilinearly near the tension rollers so that the tape can be loaded with ease.

FIGS. 16 to 20 show a tension arm and its lock mechanism for the master tape MT and the drive tape DT.

Figure 17:
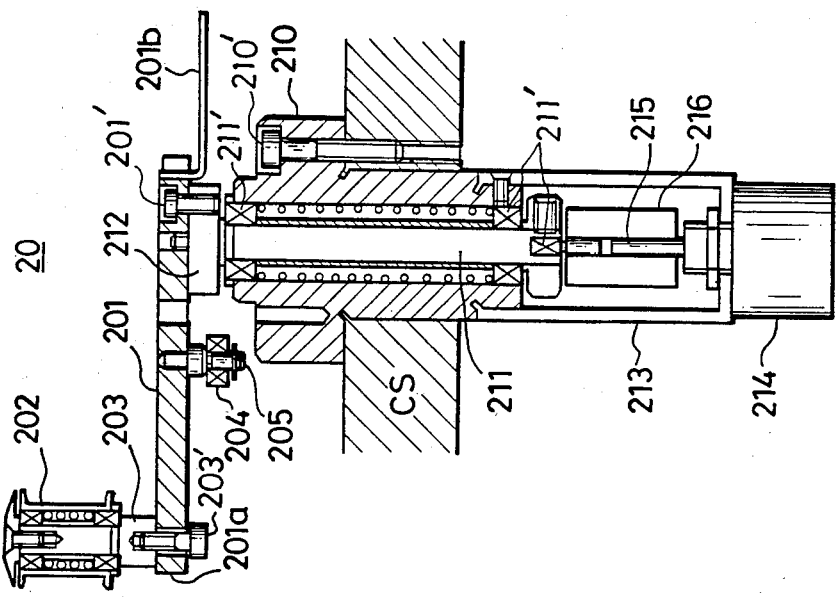
FIG. 17 is a view taken substantially along the line 17—17 of FIG. 16 and looking in the direction of the arrows.
Figure 16:
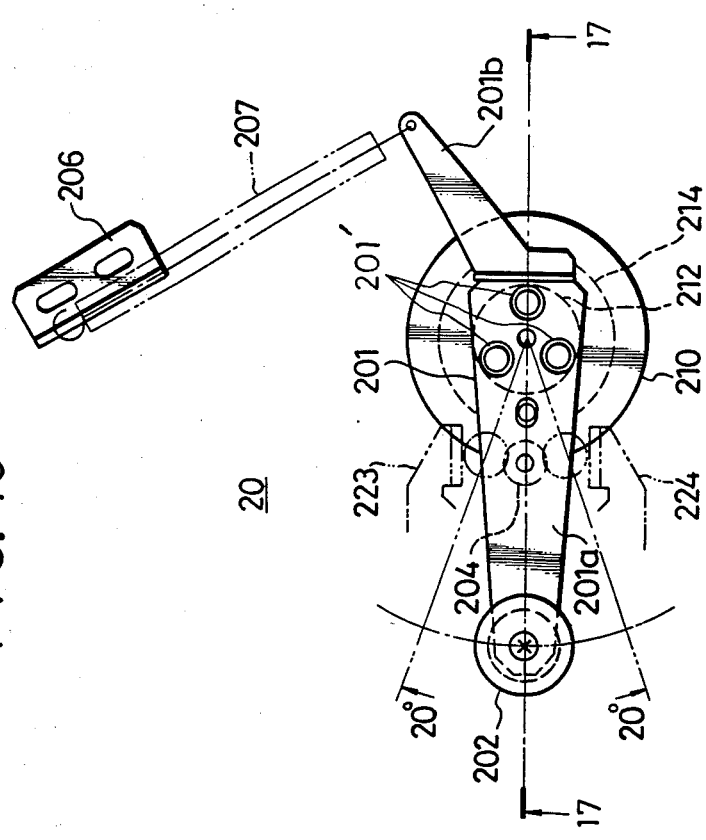
FIG. 16 is a plan view of a tension arm for the drive tape used in the present invention.

FIGS. 16 and 17 show an arrangement of the tension arm 20 (see FIG. 1) of the drive tape DT. On the upper surface of the left end 201a of an arm 201, a tension roller 202 is mounted with its shaft 203 fastened to the arm 201 by a screw 203'. A ball bearing roller 204 for locking the arm 201 is rotatably supported by a support shaft 205 that is affixed to the lower surface of the arm 201. Between the right end 201b of the arm 201 and an engaging member 206, there is stretched a tension spring 207.

A housing 210 for the tension arm 20 is inserted into an opening formed through a chassis CS and fastened thereto by a screw 210'. Within the housing 210, there is inserted a main shaft 211 the upper and lower ends of which are respectively supported by bearings 211'. The arm 201 is fixed by screws 201' to the main shaft 211 at its upper end 212 (which has an enlarged diameter), and hence the arm 201 and the main shaft 211 are rotated together. A potentiometer 214 is attached to a coupling member 213 which is engaged with the lower portion of the housing 210. A rotary shaft 215 of the potentiometer 214 is coupled through a helical coupling member 216 to the lower end of the main shaft 211 so as to be rotatable with the arm 201 and the main shaft 211 at the same time.

Lock members 223 and 224 restrict the range of rotation of the arm member 201. FIGS. 18 to 20 are respectively diagrams of the arm lock mechanism. A base member 220 having a horizontal portion 220h is fastened to the chassis CS by hexagon socket head screws 220'. On two support shafts 221 and 222 affixed to the horizontal portion 220h of the base member 220, there are respectively pivoted a generally L-shaped bent member 223 and a generally T-shaped bent member 224 each of which is used for the arm lock. The L-shaped member 223 and T-shaped member 224 are respectively provided with contact members 223a and 224a in opposing relation to the roller 204 provided on the under surface of the arm 201 (FIG. 17). Opposing leg portions 223b and 224b of the members 223 and 224 are coupled to each other by a pin 225 (FIGS. 18 and 19). A roller 227 is rotatably supported by a support shaft 226 (FIG. 20) affixed to the end 224c of the T-shaped member 224 which is on the side of the shaft 222 opposite the contact member 224a. An air cylinder 230 is inserted into an opening formed in a vertical portion 220v of the base member 220 and is fastened by a nut. The air cylinder 230 has an extension rod 231 the right-hand end of which (FIGS. 18 and 19) makes contact with the roller 227. A tension spring 232 is stretched between the vertical portion 220v of the base member 220 and the T-shaped member 224. A hose 233 selectively supplies compressed air to the air cylinder 230.

When the contact printing apparatus is set in the stop mode, compressed air is supplied to the air cylinder 230 from an external source through the hose 233. This causes the rod 231 to move in the direction in which it protrudes from the air cylinder 230, or in the right-hand direction in FIGS. 18 and 20, so that it forces the roller 227 to the right against the biasing force of the tension spring 232. Accordingly, the T-shaped member 224 is rotated counterclockwise around the support shaft 222. The rotation of the T-shaped member 224 is transmitted from the leg 224b thereof to leg 223b of the L-shaped member 223, which is coupled through the pin 225 to the leg 224b. The L-shaped member 223 is thus rotated around the support shaft 221 in the clockwise direction. As shown by two-dot chain lines in FIG. 18, the members 223 and 224 rotate to respective positions such that the contact piece members 223a and 224a thereof come into contact with opposite sides of the roller 204 of the arm 201. This facilitates loading of the tape. At this time, the roller 204 is locked at the center of its movable range and the potentiometer 214 (FIGS. 16 and 17) generates a signal voltage that produces a predetermined back tension upon transport of the tape at normal speed.

When the contact printing apparatus is set in the tape transport mode and the supply of compressed air to the air cylinder 230 is interrupted, the T-shaped member 224 is rotated in the clockwise direction (FIG. 18) by the force of the tension spring 232. In accordance with this rotation of the T-shaped member 224, the L-shaped member 223 is rotated in the counterclockwise direction and pulls the rod 231 of the air cylinder 230 in the left-hand direction so that the rod 231 is returned to the original state shown in FIGS. 18 and 19. The arm 201 is thus released from the locked state. Since the arm 201 is positioned in the center of its operating range and the detecting signal corresponding to the predetermined back tension is produced by the potentiometer 214, the tape starts running smoothly.

Thus there is provided in accordance with the invention a novel and highly-effective contact printing apparatus which can make a large number of copy tapes from a single master tape at high speed. The contact printing apparatus of the invention facilitates checking various data useful from a production control standpoint.

Many modifications of the preferred embodiment of the invention disclosed above which are within the spirit and scope of the invention will readily occur to those skilled in the art upon consideration of this disclosure. For example, the counting means and indicating means need not be those disclosed herein but may be any conventional or unconventional means that perform the requisite functions. Accordingly, the invention is not limited except by the appended claims.

We claim as our invention:

1. Contact printing apparatus for a magnetic tape; comprising:
   means defining a printing station; and
   means for driving a master tape and a slave tape so that successive portions of each are brought into substantial contract with successive portions of the other at said printing station;
   said printing station means including means for applying a printing magnetic field to said successive portions while they are in substantial contact with each other at said printing station, so that data on said master tape is copied onto said slave tape and said slave tape becomes a copy of said master tape, whereby a single master tape can be employed to produce a plurality of copies;
   further comprising means for counting the number of copies thus produced; and
   indicating means for providing an indication corresponding to the remaining life expectancy of said master tape and including first preset means for presetting a value corresponding to the initial life expectancy of said master tape and second preset means for presetting a value corresponding to a desired number of said copies to be produced.

2. Apparatus according to claim 1; wherein said counting means comprises signal reproducing means for reproducing a cue signal recorded on said master tape and means for counting the number of times said cue signal is reproduced.

3. Apparatus according to claim 1; further comprising a master controller for controlling the operation of said counting means and said indicating means.

4. Apparatus according to claim 1; wherein said driving means comprises a drive tape, means mounting said drive tape in engagement with said master tape, and motor means for transporting said drive tape.

5. Apparatus according to claim 4; further comprising cleaning tapes and means mounting said cleaning tapes in engagement with said master tape and said drive tape, respectively, whereby said master tape and said drive tape are cleaned.

6. Apparatus according to claim 5; further comprising means for selectively bringing said cleaning tapes into engagement with opposite sides of said master tape, whereby said master tape is cleaned.

7. Apparatus according to claim 4; further comprising a plurality of tape guides mounted adjacent to said printing station, said tape guides being made of a material having high resistance to wear and respectively restricting the edges of said master tape, said slave tape and said drive tape, whereby said master tape, said slave tape and said drive tape are accurately guided adjacent to said printing station.

8. Apparatus according to claim 4; further comprising a supply reel and a take-up reel for said drive tape; a first motor for driving said take-up reel for forward transport of said drive tape through said printing station; a second motor for applying back tension to said supply reel; a speed error detector for generating a speed error signal proportional to the forward transport speed of said drive tape; a tension error detector for generating a tension error signal proportional to the back tension on said drive tape; a comparator for comparing said speed error signal and said tension error signal and producing a comparator output signal; and switch means responsive to said comparator output signal for selectively supplying said tension error signal to said first and second motors during start-up of said drive tape and for supplying said speed error signal to said first motor and said tension error signal to said second motor during normal forward transport of said drive tape.

9. Apparatus according to claim 1 in which said master tape is recorded at one of a plurality of recording speeds by one of a plurality of recording systems; further comprising means for discriminating among said systems.

10. Apparatus according to claim 9; wherein said plurality of recording speeds respectively comprise substantially 20 mm/sec and substantially 32 mm/sec and said plurality of recording systems respectively comprise the β system and the VHS system.

* * * * *